United States Patent
Steffen et al.

(10) Patent No.: US 8,644,322 B2
(45) Date of Patent: *Feb. 4, 2014

(54) COMMUNICATION SYSTEM

(75) Inventors: Rainer Steffen, Munich (DE); Wolfgang Hintermaier, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 659 days.

This patent is subject to a terminal disclaimer.

(21) Appl. No.: 12/818,591

(22) Filed: Jun. 18, 2010

(65) Prior Publication Data

US 2010/0254393 A1    Oct. 7, 2010

Related U.S. Application Data

(63) Continuation of application No. PCT/EP2008/010144, filed on Nov. 29, 2008.

(30) Foreign Application Priority Data

Dec. 21, 2007   (DE) .......................... 10 2007 062 073

(51) Int. Cl.
*H04L 12/56* (2011.01)
(52) U.S. Cl.
USPC ........................................................ 370/400
(58) Field of Classification Search
None
See application file for complete search history.

(56) References Cited

U.S. PATENT DOCUMENTS

2004/0254700 A1 * 12/2004 Fehr et al. ....................... 701/36
2007/0032916 A1    2/2007 Mark

FOREIGN PATENT DOCUMENTS

DE          103 29 871 A1    1/2005
DE    10 2004 005 680 A1    8/2005

OTHER PUBLICATIONS

Nikoloutsos, E. et al., "Integrating IP Traffic into Fieldbus Networks", Industrial Electronics, 2002, ISIE 2002, Proceedings of the 2002 IEEE International Symposium on Jul. 8-11, 2002, Piscataway, NJ, USA, IEEE, vol. 1, Jul. 8, 2002, pp. 67-72. XP010598147.
Jan-Casper Kaiser, "Feldbusprotokolle im Automobilbereich: Flexray", Internet Citation, [Online], XP002418162, Retrieved from the Internet: URL:http://www.ida.ing.tu-bs.de/academics/seminars/archiv/downloads/ss2005/Kaiser_ss05.pdf> [retrieved on Jan. 31, 2007] the whole document. (Twenty-one (21) pages).
Treytl, A. et al., "Security Measures for Industrial Fieldbus Systems—State of the Art and Solutions for IP-based Approaches", Factory Communication Systems, 2004, Proceedings, 2004 IEEE International Workshop on Vienna, Austria, Sep. 22-24, 2004, Piscataway, NJ, USA, IEEE, Sep. 22, 2004, pp. 201-209. XP010756399.
German Search Report dated Jul. 25, 2008 including partial English translation (Nine (9) pages).
International Search Report dated Jan. 27, 2009 including English translation (Four (4) pages).

* cited by examiner

*Primary Examiner* — Chi Pham
*Assistant Examiner* — Kouroush Mohebbi
(74) *Attorney, Agent, or Firm* — Crowell & Moring LLP

(57) ABSTRACT

A communication system is provided having a plurality of FlexRay network nodes by which respective user data packets are provided in an IP data packet format or an Ethernet data packet format, and having a FlexRay bus system, by whose physical layer data are transmitted between the FlexRay network nodes. The IP data packet format or the Ethernet data packet format each having a plurality of bit positions. The FlexRay network nodes are set up such that contents of the bit positions of the user data packets are each converted onto corresponding signals of the physical layer of the FlexRay bus system.

13 Claims, 2 Drawing Sheets

COMMUNICATION SYSTEM

CROSS-REFERENCE TO RELATED APPLICATIONS

This application is a continuation of PCT International Application No. PCT/EP2008/010144, filed Nov. 29, 2008, which claims priority under 35 U.S.C. §119 from German Patent Application No. DE 10 2007 062 073.1, filed Dec. 21, 2007, the entire disclosures of which are herein expressly incorporated by reference.

This application contains subject matter related to U.S. application Ser. No. 12/818,583, entitled "Communication System," filed on even date herewith.

BACKGROUND AND SUMMARY OF THE INVENTION

The invention relates to a communication system, particularly for a motor vehicle.

The so-called FlexRay standard ("FlexRay") is currently establishing itself for the data transmission between motor vehicle control units, which standard is described by a preset protocol specification.

FlexRay has the purpose of meeting the increased demands of future networking in the vehicle, particularly a higher data transmission rate, a real-time capability and a fail-safe capacity. However, the current focus is primarily on the higher data rate which is necessary today as a result of the continuous increase of distributed applications, such as driver assistance systems, in premium vehicles.

In order to operate a FlexRay network node, such as a control unit, on a FlexRay bus, as a rule, two components are used: the bus transceiver and the communication controller. The bus transceiver establishes the direct connection to the data line: on the one hand, it writes the logical information, which is to be sent, in the form of voltage pulses onto the bus; on the other hand, it reads out the signals which are sent by other users on the bus. This layer is called a physical bit transfer layer or physical layer.

In addition, the FlexRay standard includes the bus protocol. The bus protocol controls how a network starts, how bus timing is established and which control units are permitted to send at which point-in-time. The communication controller converts the bus protocol in each control unit. It, for example, packages the information to be transmitted in a data packet and, at the correct point in time, transfers this data packet to the bus transceiver for transmission.

The Internet Protocol (IP) is a network protocol that is widespread in computer networks. It is a (or the) implementation of the Internet layer of the TCP/IP reference model or of the network layer of the OSI reference model. The IP forms the first layer of the Internet protocol family that is independent of the transmission medium. An IP address (Internet protocol address) is used for the unambiguous addressing of computers and other devices in an IP network.

It is now an object of the invention to provide a flexible communication system.

A communication system according to the invention comprises a plurality of FlexRay network nodes by which respective user data packets in an IP data packet format or Ethernet data packet format are provided, particularly are generated, transmitted, temporarily stored and/or modified. The IP data packet format or Ethernet data packet format each has a plurality of bit positions which are provided for the transmission of preset types of information. By way of the physical layer of a FlexRay bus system, data are transmitted between the FlexRay network nodes. In this case, the FlexRay network nodes are set up such that contents of the bit positions of the user data packets are converted, particularly indirectly or directly in each case, into corresponding signals, signal shapes, pulse shapes or signal pulses of the physical layer of the FlexRay bus system (FRB). In this case, preferably before a conversion onto the preset signals of the physical layer of the FlexRay bus system, the user data packets are not converted or packaged into FlexRay data frames.

A FlexRay network node according to the invention therefore preferably differs from a conventional FlexRay network node in that, by means of it, user data packages are provided in an IP data packet format or an Ethernet data packet format, and in that—without a temporary storage in the form of FlexRay data frames (with a corresponding preset data format)—these are imaged on the physical layer of the FlexRay bus system (FRG) which is known per se and preset, particularly standardized.

As a result, it is achieved that IP data packets or Ethernet data packets, which may originate from a plurality of known program-related or hardware-related devices, can be transmitted by way of a proven suitable physical layer which was tested particularly for motor-vehicle-related environments. Because of the fact that the rigid logical framing of the FlexRay bus system is not applied, which framing is determined essentially by the FlexRay data frame structure and the FlexRay time slot structure, but instead IP data packets and Ethernet data packets are imaged directly onto the physical layer, the flexibility advantages and cost advantages of the IP/Ethernet technology can be combined with the advantages of the FlexRay technology. On the whole, a stable, reliable, flexible, efficient and economically implementable communication system is created, particularly for a motor vehicle.

Conventional FlexRay network nodes can naturally also be provided in the communication system in addition to the FlexRay network nodes configured according to the invention.

Naturally, the FlexRay network nodes can also be set up such that, in addition to the conversion of data onto the physical FlexRay layer according to the invention, they also carry out a conventional conversion of data onto the physical FlexRay layer, the data having previously been packaged in FlexRay data frames. Depending on the embodiment, the FlexRay bus system and/or the FlexRay network nodes may be devices which are modified or "shed" with respect to a conventional FlexRay bus system and/or conventional FlexRay network nodes.

Within the scope of the invention, an IP data packet includes data packets formed according to the Internet protocol but also data packets that are derived from such an Internet-protocol-conformal data packet or are formed in conformity with such data packets according to the Internet protocol; in this sense, an Ethernet packet may also be considered to be an IP data packet. For example, within the scope of the invention, an IP data packet also includes data packets which are formed according to the Internet protocol but which have further data, or parts of data packets which are formed according to the Internet protocol. Likewise, within the scope of the invention, the term "IP data packet" includes data packets which directly or indirectly originate from an Internet protocol layer. As a rule, the IP data packet has an IP address or destination address.

Within the scope of the invention, a FlexRay network node also includes network nodes which execute or comprise only the physical layer of a FlexRay protocol. Correspondingly, within the scope of the invention, a FlexRay bus system includes a bus system or bus protocol which executes or comprises only the physical layer of the FlexRay Protocol. The other layers may be completely or partially executed according to other protocols or specifications, for example, known per se.

A communication system which includes an IP network and a FlexRay bus system is particularly flexible, in which case the IP network is coupled with the FlexRay bus system by way of a router.

A FlexRay network node and/or the router is preferably set up such that, by means of it, all data packets transmitted by way of the FlexRay bus system are received and interpreted corresponding to an IP data packet format or Ethernet data packet format.

It is particularly preferable for the FlexRay network nodes to be set up for implementing a media access layer by which the user data packets provided in an IP data packet format or Ethernet data packet format are converted onto corresponding signals of the physical layer of the FlexRay bus system.

The FlexRay bus system, particularly the physical layer of the FlexRay bus system, is preferably based on two physical FlexRay channels (first channel and second channel). For this purpose, preferably a communication control device, such as a processor device correspondingly set up with respect to the programs, of at least one FlexRay network node is set up such that the physical layer of the FlexRay bus system includes a first and a second physical channel.

In addition, the communication control device is advantageously set up such that data are sent by way of the first channel and data are received by way of the second channel.

As an alternative or in addition thereto, the communication control device is preferably set up such that contents of the bit positions of the user data packets, which are present in the IP data packet format or in the Ethernet data format, are in each case converted onto corresponding signals of the first channel. Thus, signals generated according to the invention are transmitted by way of the first channel. Other, for example, conventionally generated signals are transmitted, for example, by way of the second channel.

Contents of the bit positions of the user data packets, which are present in the IP data packet format or in the Ethernet data packet format, for example, are never converted onto signals of the second channel. Data present in the IP data packet format or in the Ethernet data packet format are assigned by the FlexRay network nodes—providing the IP data packet or the Ethernet data packet—only to the preset first channel, and are also only expected on this channel by other FlexRay bus system users.

As an alternative or in addition thereto, the communication control device is preferably set up such that contents of the bit positions of the user data packets, which are present in the FlexRay data frame format, are each converted onto corresponding signals of the second channel.

As an alternative or in addition to the above-mentioned embodiment, the FlexRay bus system is based on two physical FlexRay channels. In this case, at least one FlexRay network node and/or the router are setup such that, by way of the FlexRay network node and/or the router, FlexRay data frames containing an IP data packet are assigned to only one of the two physical FlexRay channels. For example, a FlexRay data frame containing an IP data packet is, for example, never assigned to the other FlexRay channel. FlexRay data frames containing an IP data packet are assigned by the FlexRay network nodes (or routers)—providing the IP data packet—only to the preset FlexRay channel and are also expected only on this FlexRay channel by other FlexRay bus system users.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
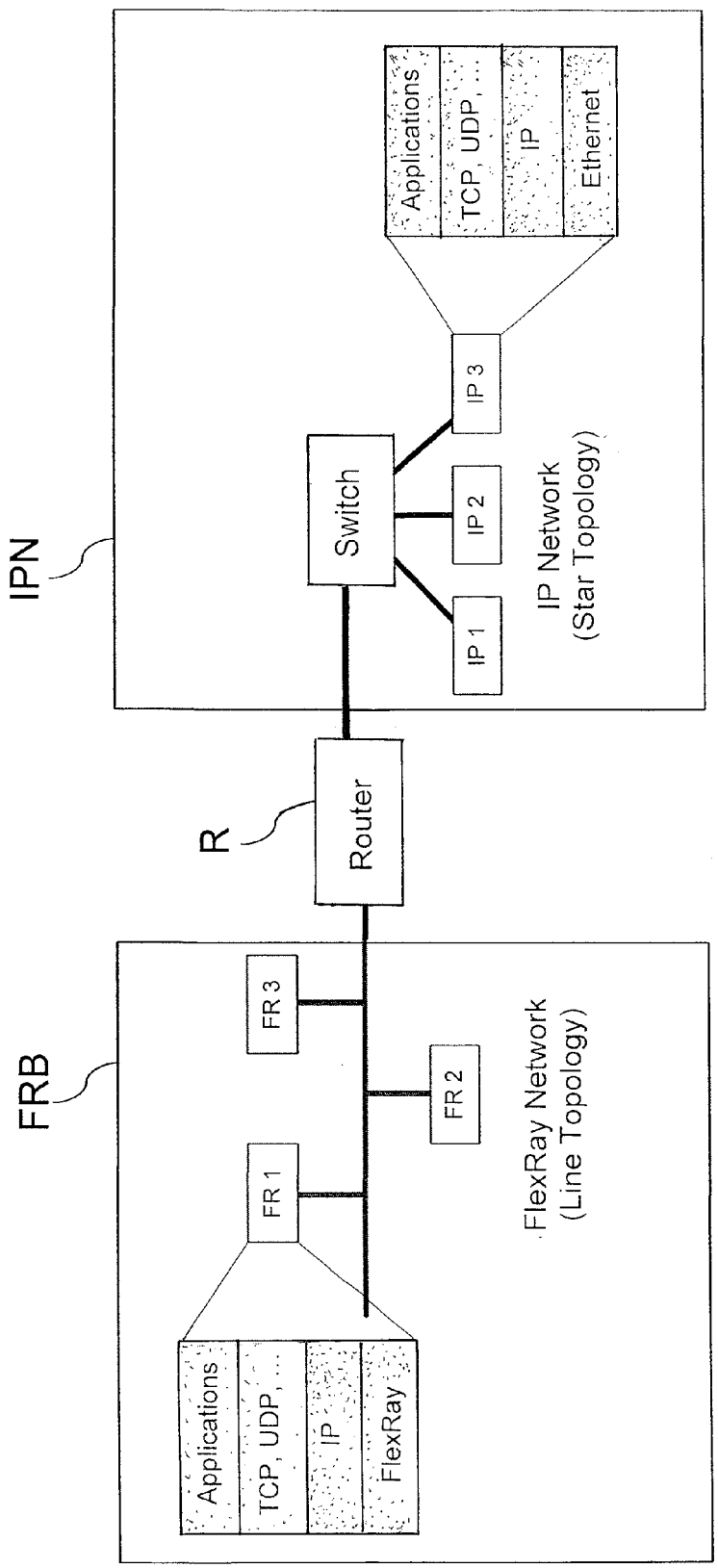
FIG. 1 is a view of a simplified representation of a communication system.

FIG. 1 illustrates a communication system having a modified FlexRay bus system FRB and an IP network IPN, which are mutually coupled by means of a router R. The physical layer FlexRayPHY of the FlexRay bus system FRB mutually connects a plurality of modified FlexRay network nodes FR1, FR2, FR3.

Within the IP Network IPN, several IP network nodes IP1, IP2, IP3 are connected with one another by way of an IP switch. The IP network nodes IP1, IP2, IP3 and/or the FlexRay network nodes FR1, FR2, FR3 may each comprise a motor vehicle control unit (not shown) or be coupled therewith. In order to exchange data between the network nodes among one another and/or with the router, a communication protocol is installed on the network nodes, which communication protocol is divided into different layers.

In the case of the FlexRay network nodes FR1, FR2, FR3, the bottom layer (bit transfer layer, physical layer) is formed or determined by the FlexRay specification or the corresponding layer of the FlexRay protocol. The IP (Internet Protocol) layer is situated as the network layer above the bottom layer. For example, the transmission control protocol (TCP) or the user datagram protocol (UDP) is situated as the transport layer above the IP (Internet protocol) layer. Different applications are implemented in the application layer above the transport layer.

Data are generated by the applications and are forwarded in a defined form to the transport layer. By way of the transport layer, these data are updated particularly by control data and are forwarded in a defined form to the network layer. By way of the network layer, the data, further updated particularly by control data, are packaged into IP data packets and are transferred to the FlexRay layer. For the physical bit transfer, the logical values of the bit positions of the IP data packet are converted into physical signals corresponding to inputs of the FlexRay protocol and are transmitted by way of the FlexRay bus, particularly the corresponding physical lines.

For the reception of data by a FlexRay network node FR1, FR2, FR3, this sequence can take place in the reverse direction.

In the case of the IP network nodes IP1, IP2, IP3, the bottom layer (bit transfer layer) is formed by the Ethernet protocol or the corresponding layer of the Ethernet protocol. As the network layer, the IP (Internet protocol) layer is situated above the latter. For example, the transmission control protocol (TCP) or the user datagram protocol (UDP) is situated as the transport layer above the Internet protocol layer. Various applications are implemented in the application layer above the transport layer.

As mentioned above, also in the case of the IP network nodes IP1, IP2, IP3, data are generated by the applications and are forwarded in a defined form to the transport layer. By way of the transport layer, these data are updated particularly by control data and are forwarded in a defined form to the network layer. By way of the network layer, the data, further updated particularly by control data, are packaged into IP data packets and are transferred to the Ethernet layer. There the IP data packets for the physical bit transfer by way of the Ethernet are packaged in an Ethernet data frame. For the reception of data by an IP network node, this sequence can again take place in the reverse direction.

Figure 2:
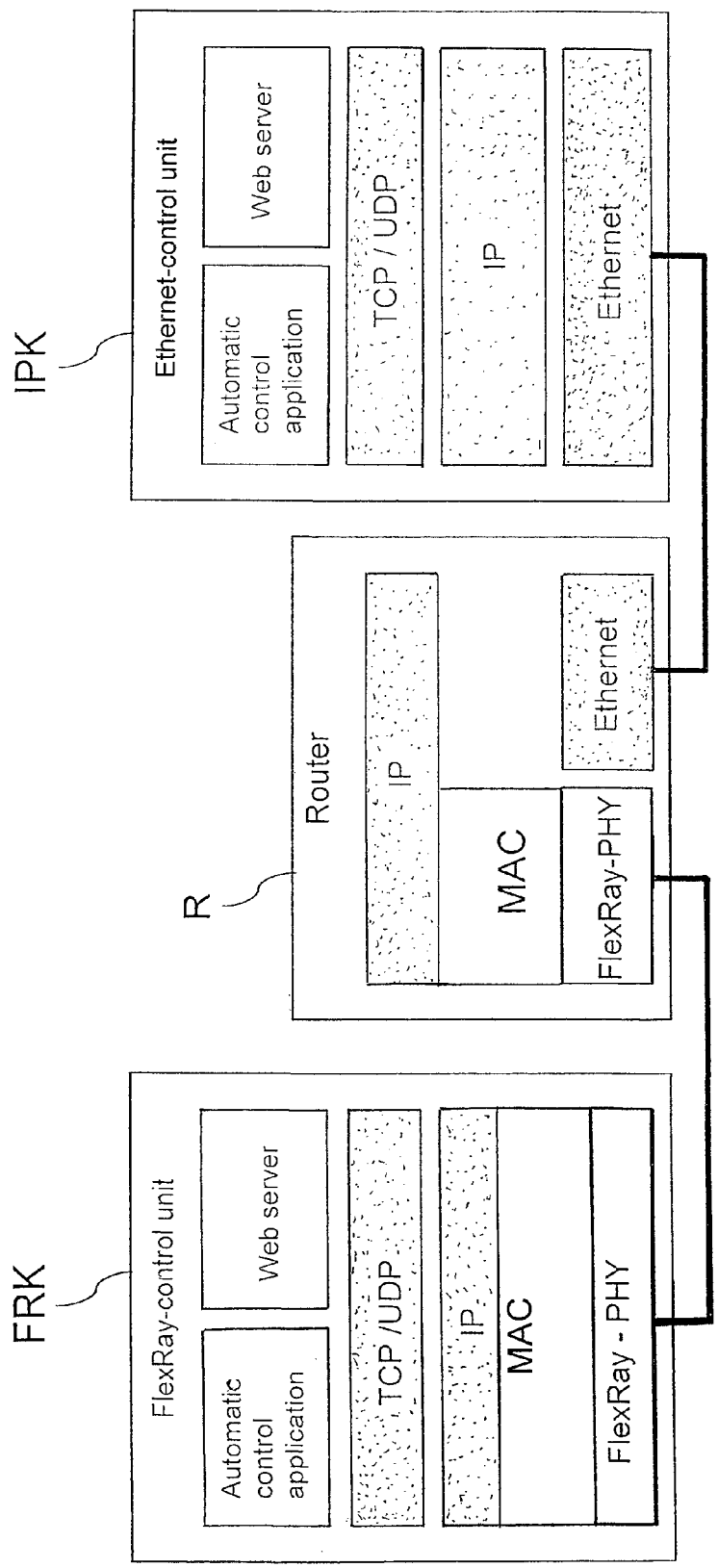
FIG. 2 is a view of a simplified protocol layer representation according to a first embodiment.

As examples, FIG. 2 illustrates a FlexRay network node FRK and an IP network node IPK with the pertaining protocol layers. The FlexRay network node FRK and the IP network node IPK are mutually coupled by a router R.

The IP data packets provided by the IP layer IP of the FlexRay network node FRK are converted by a correspondingly set-up media access layer MAC directly onto the physical layer of the FlexRay protocol. The corresponding physical signals are received by the router R and, by way of a corresponding media access layer MAC, are imaged back onto corresponding IP data packets. In a manner known per se, these IP data packets can then be switched from the router by way of the Ethernet onto a destination IP network node IPK.

In addition, by way of the media access layer MAC, a more flexible media access process can be implemented in comparison with the TDMA (time division multiple access) of the FlexRay specification. Particularly the following processes, which are known per se, are especially advantageous:

Aloha process: As soon as the data are applied for the transmission, they are sent onto the bus. Since, during the transmission, collisions may occur as a result of simultaneously sending nodes, each transmitted data packet will be confirmed.

Carrier Sense Multiple Access (CSMA): Before the bus is accessed in order to send, it is checked whether another node is already transmitting a message (carrier sense). If this is not so, the bus can be accessed. Should the bus currently be occupied, different strategies can be used for the further observation of the bus condition:

1-persistent: As soon as it is recognized that the bus is unoccupied, the transmission will be started. Should several nodes want to send simultaneously, collisions may occur.

Non-persistent: After the detection of an occupied channel, a waiting period will take place for a random back-off time before it is attempted again to access the bus.

p-persistent: As soon as it detected that the bus is unoccupied, the sending onto the bus will take place with a probability of p and a defined waiting period will occur with a probability of 1-p.

If the physical layer is capable of detecting a collision, this information can be used for solving access conflicts. One method of solving access conflicts consists of waiting for a random time period after a collision before another access takes place to the medium.

Prioritized CSMA (carrier sense multiple access): A priority can be assigned to the data packets as a result of a variation of the waiting periods before the bus may be accessed.

Master slave: In order to permit a deterministic time behavior, there is the possibility of regulating the bus access by way of a master/slave method. In this case, at least one master exists in the system and regulates the access by the bus users by explicitly and exclusively assigning send rights to them.

It is also possible to secure the transmitted data packets in each case by an acknowledgement packet (ACK) or a no-acknowledgement packet (NACK). If necessary, a new transmission of the lost data package can then be carried out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system, comprising:
   a FlexRay bus system having a physical layer by which data are transmitted between the FlexRay network nodes;
   a plurality of FlexRay network nodes by which respective user data packets are provided over the physical layer of the FlexRay bus system while in an IP data packet format or an Ethernet data packet format, said IP data packet format or said Ethernet data packet format each having a plurality of bit positions;
   wherein the FlexRay network nodes are configured such that contents of the bit positions of the user data packets are each converted onto corresponding signals of the physical layer of the FlexRay bus system.

2. The communication system according to claim 1, wherein each FlexRay network node is operatively configured such that, via said node, all data packets transmitted by way of the FlexRay bus system are received and interpreted corresponding to the IP data packet format or the Ethernet data packet format.

3. The communication system according to claim 2, wherein the FlexRay network nodes are operatively configured to implement a media access layer by which the user data packets provided in the IP data packet format or the Ethernet data packet format are converted onto corresponding signals of the physical layer of the FlexRay bus system.

4. The communication system according to claim 2, wherein the communication control device is operatively configured such that data are sent by way of a first physical channel and received by way of a second physical channel of the FlexRay bus system.

5. The communication system according to claim 1, wherein the FlexRay network nodes are operatively configured to implement a media access layer by which the user data packets provided in the IP data packet format or the Ethernet data packet format are converted onto corresponding signals of the physical layer of the FlexRay bus system.

6. The communication system according to claim 5, wherein the at least one FlexRay network node comprises a communication control device operatively configured such that the physical layer of the FlexRay bus system comprises a first and a second physical channel, and wherein the communication control device is operatively configured such that data are sent by way of the first physical channel and received by way of the second physical channel.

7. The communication system according to claim 1, wherein at least one FlexRay network node comprises a communication control device operatively configured such that the physical layer of the FlexRay bus system comprises a first and a second physical channel.

8. The communication system according to claim 7, wherein the communication control device is operatively configured such that data are sent by way of the first physical channel and received by way of the second physical channel.

9. The communication system according to claim 8, wherein the communication control device is operatively configured such that the contents of the bit positions of the user data packets in the IP data packet format or the Ethernet data packet format are, in each case, converted onto corresponding signals of the first channel.

10. The communication system according to claim 8, wherein the communication control device is operatively configured such that contents of the bit positions of the user data packets in the FlexRay data frame format are, in each case, converted onto corresponding signals of the second channel.

11. The communication system according to claim 7, wherein the communication control device is operatively configured such that the contents of the bit positions of the user data packets in the IP data packet format or the Ethernet data packet format are, in each case, converted onto corresponding signals of the first channel.

12. The communication system according to claim 11, wherein the communication control device is operatively configured such that contents of the bit positions of the user data packets in the FlexRay data frame format are, in each case, converted onto corresponding signals of the second channel.

13. The communication system according to claim 7, wherein the communication control device is operatively configured such that contents of the bit positions of the user data packets in the FlexRay data frame format are, in each case, converted onto corresponding signals of the second channel.

* * * * *